June 18, 1963   G. ALFIERI   3,094,341
PNEUMATIC SUSPENSION DEVICE
Filed July 22, 1960
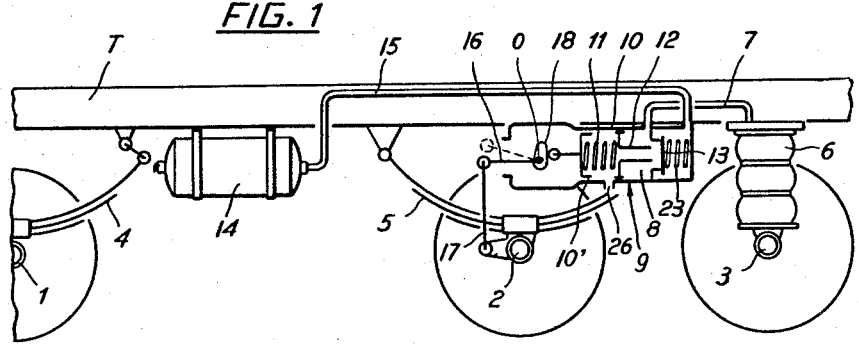
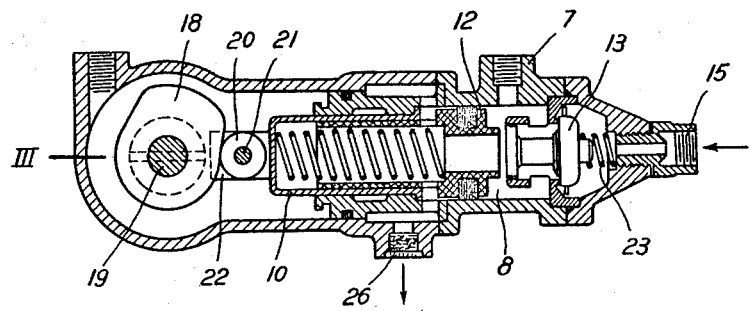
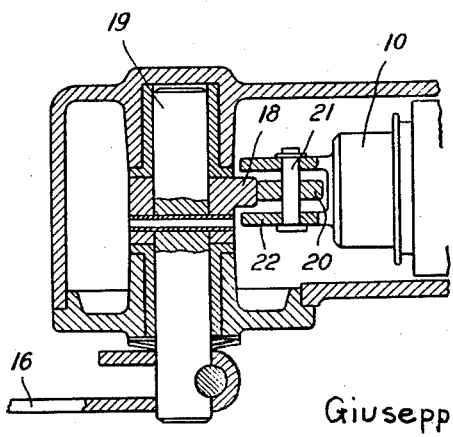
INVENTOR.
Giuseppe Alfieri
BY
Bierman + Bierman
Attorneys

United States Patent Office 3,094,341
Patented June 18, 1963

3,094,341
PNEUMATIC SUSPENSION DEVICE
Giuseppe Alfieri, Milan, Italy, assignor to Fabbrica Italiana Magneti Marelli S.p.A., a corporation of Italy
Filed July 22, 1960, Ser. No. 44,710
Claims priority, application Italy Aug. 3, 1959
8 Claims. (Cl. 280—124)

The present invention refers to an assembly and compressed air distributor apparatus for pneumatic suspensions particularly on heavy vehicles.

It is commonly known that in vehicles having three or more axles, at least one axle functions as an auxiliary axle, and that is to say that it intervenes only when the vehicle, motor unit, or trailer is partially or totally loaded. In a three axle vehicle, it is the third axle which intervenes only under load conditions, and allowing the first and second axles to integrally support the vehicle tare.

In any case, it is commonly known that whatever may be the load conditions, the weight of a vehicle is imposed onto the wheel by means of resilient suspension, which may be of the mechanical or pneumatic type, or a combination of both.

In the case of vehicles of the type under discussion furnished with leaf spring suspensions, it has been found that the adoption of mechanical suspensions for the axle and auxiliary axles is not convenient, in consideration of the installation and connecting up difficulties involved with said leaf springs.

The aim of the present invention is to employ a pneumatic type of suspension for the axle or auxiliary axles, and said suspension being of simple construction and easy installation.

The pneumatic assembly according to the present invention comprises at least one resilient bellows installed between the auxiliary axle and the vehicle chassis, and a compressed air distributor solidly connected with the chassis for the feeding or exhaust of the bellows, said distributor being operated by a lever system sensitive to the distance between the wheel axle, preferably the axle sustaining the heaviest load, and the chassis in such a manner that the pressure value of the air delivered to the bellows is directly proportional to the amount of lowering of the chassis, and therefore to the load weighing on the vehicle.

Further, and in order to take into consideration the appreciable lowerings of the chassis due to bouncing and uneven road conditions, the distributor activating element is comprised of a cam, shaped in such a manner as to allow the lever to which it is connected to rotate idly in angles greater than the angle required for operating the lever.

The further features and characteristics of the invention will be illustrated and described, and only for the purposes of example, with reference to the attached drawings referring to a system for a three axle vehicle.

FIGURE 1 shows a diagram of the general assembly comprising the suspension, the distributor, and the operating leverage.

FIGURE 2, a partial view of the distributor apparatus and

FIGURE 3, a longitudinal section of same across line III—III of FIGURE 2.

With reference to the assembly shown in FIGURE 1: T indicates the vehicle chassis whilst 1, 2 and 3 respectively indicate the 1st, 2nd, and 3rd axle and 4 and 5 the leaf type suspensions mounted on axles 1 and 2.

According to the invention, the third axle suspension is comprised of at least one pneumatic bellows 6, situated between the wheel axle and the chassis, and by means of pipe 7, in communication with the feed chamber 8 of distributor 9. This latter is of the commonly known type, and is substantially comprised of cylinder 10, with regulating spring 11, operating push rod 12 which is slidable in chamber 8, and inlet valve 13 controlled by said rod.

Chamber 8 is in communication with the assembly air tank 14, through valve 13 and pipe 15, whilst it is put in communication with the atmosphere by means of an internal pipe contained in push rod 12, and an outlet hole 26 contained in the distributor wall.

The leverage control of cylinder 10 is comprised of lever 16 and tie rod 17 hinge connected to each other. Lever 16 carries a cam 18 solidly connected to it, and by means of which during rotation around the axis, passing through O, it is made to act on the cylinder.

The extremity of the tie rod 17 which is not connected to the lever is hinge connected in a similar manner to the second axle of the vehicle or part of same.

The connection, cam-cylinder as well as the shape of the cam are illustrated in FIGURES 2 and 3.

Cam 18 is keyed onto shaft 19 solid with control lever 16, and also acts on cylinder 10 by means of a roller 20, mounted on journal 21 held by fork 22.

The cam is shaped in such a manner as to allow excursion increments of control lever 16 before and after the true operating angle, so as to absorb the changes in chassis level caused by bouncing and irregularities in the road surface.

It is obvious that the cam profile can be shaped in such a manner as to obtain any pre-established correspondence between the chassis deflection and the pressure delivery.

The device operates as follows: When the vehicle is not under load, lever 16 and cam 18 are in the position of the figures which correspond to the rest position of cylinder 10; there is no pressure in the pneumatic system.

Increasing the load on the vehicle determines the lowering of chassis T and distributor 9 to which it is solidly attached, causing a clockwise rotation of lever 16 and cam 18. By means of roller 20, which eliminates creeping or friction, cylinder 10 is thrust towards the right (see drawing) and determining by means of spring 11, the displacement of push rod 12, and then successively the opening of inlet valve 13. In this manner chamber 8 is loaded, and therefore compressed air is delivered to the pneumatic spring until said valve 13 is brought back to its seat by the action of opposed spring 23. This is a condition which arises whenever, for a given load on the cylinder, equilibrium of forces acting on the opposite walls of push rod 12 is reached (load on one side and pneumatic pressure on the other).

As a consequence, with each load applied to cylinder 10, there corresponds a feed pressure of bellows 6. However, the load being determined by the rotation of cam 18, that is to say the lowering of the chassis, it follows as a conclusion that the feeding or loading of the bellows is in pressure values directly proportional to the load acting on the vehicles. Therefore maximum load will correspond to the maximum pressure delivered.

I claim:

1. A pneumatic suspension device for vehicles having at least one principal axle, said axle having a fixed spring rate, a chassis supported by said principal axle, an auxiliary axle having a bellows mounted between and in contact with said auxiliary axle and said chassis, a compressed air distributor secured to said chassis, a chamber in said distributor, a connection from a source of compressed air to said chamber, a connection from said bellows to said chamber, a valve and seat in said chamber between said connections, means for seating said valve, a slidable push rod in said chamber, means for biasing said push rod toward said valve and seat, control linkage mounted on said principal axle and operatively connected to said biasing means for moving said push rod to unseat said valve when said chassis is lowered relative to said principal axle, a vent in said chamber adapted to communicate with said bellows when said valve is seated and said push rod is retracted by pressure of air from said bellows.

2. A device according to claim 1 wherein said valve urged toward the closed position by a closure spring, a hollow push rod in said body having a sealed position and a venting position and adapted to actuate said valve against the bias of said closure spring, said venting position being operative when said valve is seated, a piston formed by the end of said push rod farthest from said seat, said inlet being on the side of said seat away from said push rod, said opening between said seat and said piston, said outlet being on the side of said piston away from said opening, whereby when said valve is open said opening communicates with said inlet, and when said valve is closed said opening communicates with said outlet.

3. A device according to claim 1 wherein said control linkage is between said distributor and the axle carrying the heaviest portion of the load.

4. A device according to claim 2 wherein said push rod is biased toward said seat by an actuating spring, the end of said actuating spring away from said push rod being in contact with said control linkage whereby said push rod is caused to move by variations in the distance between said chassis and said one of said axles.

5. A device according to claim 4 wherein said control linkage comprises a tie rod connected to one of said principal axles at one end, the other end of said tie rod being pivotally connected to one end of a lever, the other end of said lever being connected to a pivotal shaft carrying a cam fixedly mounted thereon, said cam bearing against said actuating spring and adapted to vary the pressure on said actuating spring as said cam is caused to rotate by said control linkage.

6. A device according to claim 5 wherein said cam is provided with a bearing surface comprising a low section and a high section, there being a sloping section between said low section and said high section, whereby said cam rotates a predetermined distance without change of pressure on said actuating spring and, after further rotation causing an increase in said pressure, no additional pressure change is caused on still further rotation of said cam.

7. A device according to claim 5 wherein a roller is mounted on said end of said actuating spring nearest said cam, said cam adapted to bear against said roller.

8. A device according to claim 7 wherein a fork is affixed to said end of said actuating spring nearest said cam, said roller being jouurnaled on a shaft rotatably mounted between the prongs of said fork.

References Cited in the file of this patent

UNITED STATES PATENTS

| | | |
|---|---|---|
| 2,670,201 | Rossman | Feb. 23, 1954 |
| 2,691,420 | Fox | Oct. 12, 1954 |
| 2,864,454 | La Belle | Dec. 16, 1958 |
| 2,903,272 | Bordenkircher | Sept. 8, 1959 |
| 2,905,462 | Christensen | Sept. 22, 1959 |
| 2,957,705 | Herbenar | Oct. 25, 1960 |